US009325626B2

(12) United States Patent
Vasseur

(10) Patent No.: US 9,325,626 B2
(45) Date of Patent: Apr. 26, 2016

(54) METHOD AND APPARATUS TO REDUCE CUMULATIVE EFFECT OF DYNAMIC METRIC ADVERTISEMENT IN SMART GRID/SENSOR NETWORKS

(71) Applicant: Cisco Technology, Inc., San Jose, CA (US)

(72) Inventor: Jean-Philippe Vasseur, Saint Martin D'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/275,701

(22) Filed: May 12, 2014

(65) Prior Publication Data

US 2014/0247726 A1 Sep. 4, 2014

Related U.S. Application Data

(63) Continuation of application No. 12/951,198, filed on Nov. 22, 2010, now Pat. No. 8,743,866.

(60) Provisional application No. 61/374,105, filed on Aug. 16, 2010.

(51) Int. Cl.
| | | |
|---|---|---|
| *H04L 12/28* | (2006.01) | |
| *H04L 12/801* | (2013.01) | |
| *H04L 12/715* | (2013.01) | |
| *H04W 40/24* | (2009.01) | |

(52) U.S. Cl.
CPC .............. *H04L 47/15* (2013.01); *H04L 45/04* (2013.01); *H04L 47/12* (2013.01); *H04W 40/248* (2013.01)

(58) Field of Classification Search
None
See application file for complete search history.

(56) References Cited

U.S. PATENT DOCUMENTS

| 5,412,654 A | 5/1995 | Perkins | |
|---|---|---|---|
| 6,628,643 B1 * | 9/2003 | Park .................. | H04L 45/02 370/254 |

(Continued)

FOREIGN PATENT DOCUMENTS

| WO | 2011/115668 A1 | 9/2011 |
|---|---|---|
| WO | 2011/115680 A1 | 9/2011 |

OTHER PUBLICATIONS

Vasseur, Jean-Philippe, Techniques for Managing Directed Acyclic Graphs in a Computer Network, U.S. Appl. No. 61/374,105, filed Aug. 16, 2010, 38 pages.

(Continued)

*Primary Examiner* — Joseph E Avellino
*Assistant Examiner* — Phyllis A Book
(74) *Attorney, Agent, or Firm* — Polsinelli PC

(57) ABSTRACT

The subject disclosure relates to a method for directing acyclic graph routing and management for Low power and Lossy Networks (LANs). A system may identify a gain factor that indicates a potential gain that can be obtained in link cost from a node in a network represented by a direct acyclic graph (DAG) to the root node of the DAG when an upper node in the DAG changes its routing decision. When the gain factor exceeds a threshold, the node can transmit a DAG rebuild request to other nodes in the DAG. Upon receiving the request, the system may determine whether to satisfy the DAG rebuild request based on the number of requesting nodes. Based on the determination, the system may select a new parent node for the node that receives the request. The DAG rebuild can decrease in link cost from the transmitting node to the root node.

20 Claims, 6 Drawing Sheets

(56) References Cited

U.S. PATENT DOCUMENTS

| | | | |
|---|---|---|---|
| 6,633,544 B1 | 10/2003 | Rexford et al. | |
| 6,667,957 B1 * | 12/2003 | Corson | H04L 45/02 370/238 |
| 7,111,074 B2 | 9/2006 | Basturk | |
| 7,161,929 B1 * | 1/2007 | O'Neill | H04L 29/12216 370/349 |
| 7,266,085 B2 | 9/2007 | Stine | |
| 7,567,547 B2 | 7/2009 | Mosko et al. | |
| 7,656,857 B2 * | 2/2010 | Thubert | H04L 45/12 370/238 |
| 7,693,064 B2 * | 4/2010 | Thubert | H04L 43/022 370/235 |
| 7,701,940 B2 | 4/2010 | Novello et al. | |
| 7,860,025 B2 | 12/2010 | Thubert et al. | |
| 7,924,722 B2 | 4/2011 | Thubert et al. | |
| 7,961,642 B2 | 6/2011 | Agrawal et al. | |
| 7,995,480 B2 | 8/2011 | Tarkoma | |
| 8,094,555 B2 | 1/2012 | Ward et al. | |
| 8,111,684 B2 | 2/2012 | Thubert et al. | |
| 8,214,526 B2 | 7/2012 | Wu et al. | |
| 8,270,313 B2 | 9/2012 | Tao et al. | |
| 2003/0033394 A1 * | 2/2003 | Stine | H04L 12/5695 709/222 |
| 2006/0140111 A1 | 6/2006 | Vasseur et al. | |
| 2006/0291404 A1 * | 12/2006 | Thubert | H04L 45/02 370/254 |
| 2007/0091811 A1 * | 4/2007 | Thubert | H04L 43/022 370/238 |
| 2007/0208693 A1 * | 9/2007 | Chang | G06F 17/30958 |
| 2008/0080473 A1 | 4/2008 | Thubert et al. | |
| 2008/0219272 A1 * | 9/2008 | Novello | H04L 47/11 370/401 |
| 2008/0240078 A1 * | 10/2008 | Thubert | H04W 40/08 370/351 |
| 2010/0158004 A1 * | 6/2010 | Tarkoma | H04L 45/00 370/392 |
| 2010/0188979 A1 | 7/2010 | Thubert et al. | |
| 2010/0189113 A1 * | 7/2010 | Csaszar | H04L 45/00 370/400 |
| 2011/0080853 A1 | 4/2011 | Thubert et al. | |
| 2011/0116389 A1 * | 5/2011 | Tao | H04L 45/18 370/252 |
| 2011/0228696 A1 * | 9/2011 | Agarwal et al. | 370/253 |
| 2011/0228788 A1 | 9/2011 | Thubert et al. | |
| 2011/0231573 A1 | 9/2011 | Vasseur et al. | |
| 2012/0039186 A1 | 2/2012 | Vasseur | |
| 2012/0039190 A1 | 2/2012 | Vasseur | |
| 2012/0099587 A1 | 4/2012 | Fan et al. | |
| 2012/0113807 A1 | 5/2012 | Vasseur et al. | |
| 2012/0113863 A1 | 5/2012 | Vasseur et al. | |
| 2012/0117208 A1 | 5/2012 | Shaffer et al. | |
| 2012/0117213 A1 | 5/2012 | Shaffer et al. | |
| 2012/0117268 A1 | 5/2012 | Shaffer et al. | |

OTHER PUBLICATIONS

Vasseur, Jean-Philippe, Partitioning Directed Acyclic Graph (DAG) Topologies, U.S. Appl. No. 12/895,991, filed Oct. 1, 2010, 30 pages.
Winter, et al., RPL: IPv6 Routing Protocol for Low Power and Lossy Networks, Internet Engineering Task Force Internet Draft, draft-ietf-roll-rpl-15, Nov. 6, 2010, 145 pages.
Vasseur, et al., Routing Metrics Used for Path Circulation in Low Power and Lossy Networks, Internet Engineering Task Force Internet Draft, draft-ietf-roll-routing-12, Nov. 8, 2010, 31 pages.
Thubert, P., RPL Objective Function 0, Internet Engineering Task Force Internet Draft, draft-ietf-roll-of0-03, Jul. 29, 2010.
U.S. Appl. No. 13/117,276 entitled Distributed Control Technique for RPL Topology, filed May 27, 2011 by Navneet Agarwal, 33 pages.

* cited by examiner

METHOD AND APPARATUS TO REDUCE CUMULATIVE EFFECT OF DYNAMIC METRIC ADVERTISEMENT IN SMART GRID/SENSOR NETWORKS

RELATED APPLICATIONS

The present application is a continuation of U.S. patent application Ser. No. 12/951,198, filed Nov. 22, 2010, entitled METHOD AND APPARATUS TO REDUCE CUMULATIVE EFFECT OF DYNAMIC METRIC ADVERTISEMENT IN SMART GRID/SENSOR NETWORKS, by Jean-Philippe Vasseur, which claims priority to U.S. Provisional Application Ser. No. 61/374,105, filed on Aug. 16, 2010, entitled TECHNIQUES FOR MANAGING DIRECTED ACYCLIC GRAPHS IN A COMPUTER NETWORK, by Jean-Philippe Vasseur. The contents of these are incorporated by reference herein in their entireties.

TECHNICAL FIELD

The present disclosure relates generally to computer networks, and, more particularly, to directed acyclic graph (DAG) routing and management, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound control traffic, support local (and slow) repair, etc. The RPL routing protocol provides a flexible method by which each node performs DODAG discovery, construction, and maintenance.

One problem that confronts LLNs is network stability, and as such, various measures to reduce management traffic have been established, such as limiting response to link failure and "smoothing" dynamic metric values so new metrics are only advertised when their values exceed some threshold. In particular, since electing a new parent in a DAG leads to unstable routing topologies, traffic flaps, jitter, etc., new metrics are advertised only if the metric values substantially change. The disadvantage of such an approach is the resulting cumulative effect (cumulative error), where for "deep" networks (networks having a large number of hops), the cumulative error could result in either a better unselected path being available or, conversely, a selected path that is worse than believed. Current solutions in RPL consist of rebuilding the entire DAG manually or upon the expiration of a timer, which can be costly, inefficient and not related to actual changes in the network.

BRIEF DESCRIPTION OF THE DRAWINGS

The embodiments herein may be better understood by referring to the following description conjunction with the accompanying drawings in which like reference numerals indicate identically or functionally similar elements, of which.

DESCRIPTION OF EXAMPLE EMBODIMENTS

Overview

Figure 1:
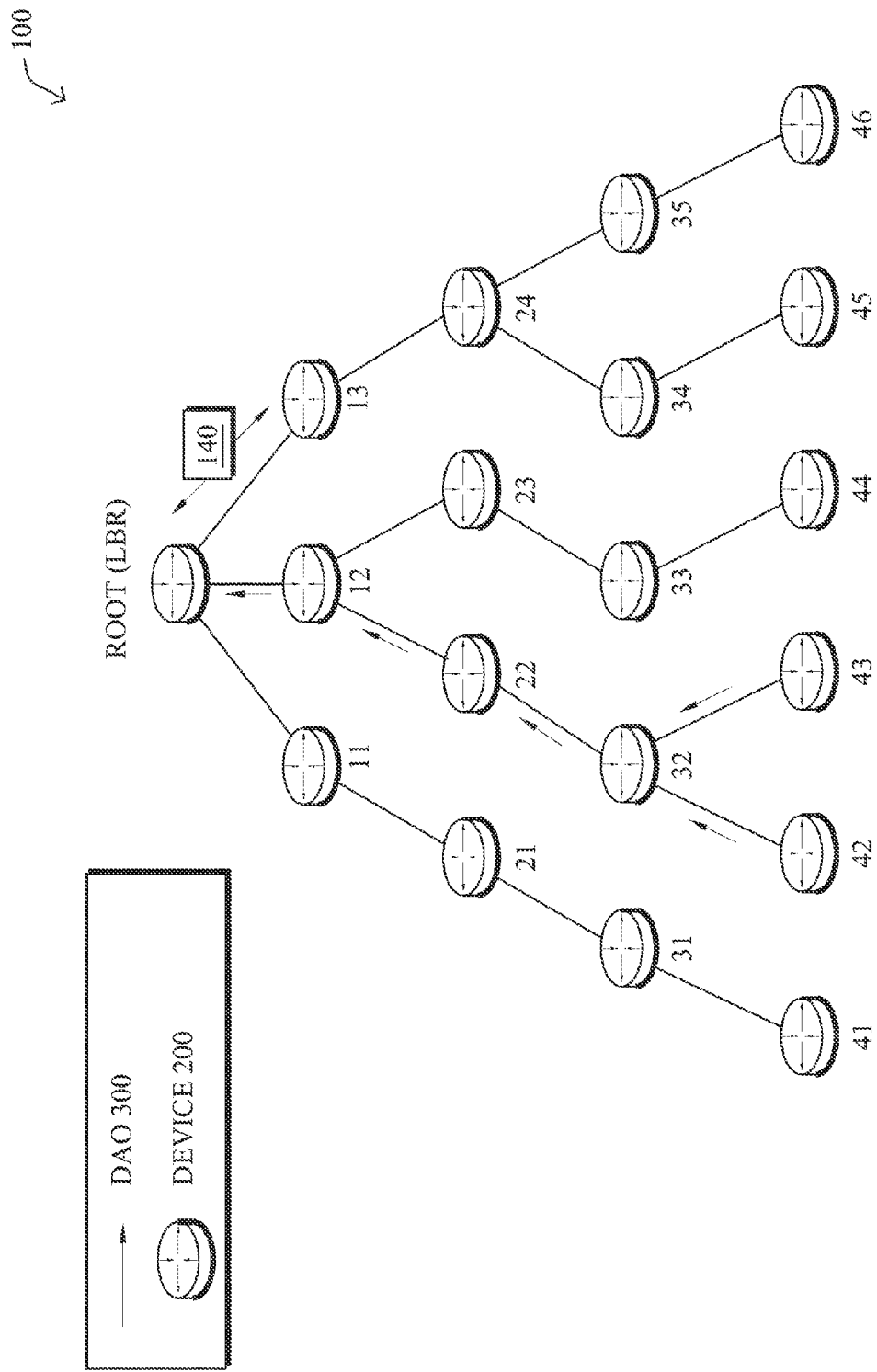
FIG. 1 illustrates an example computer network represented by a directed acyclic graph (DAG)

According to one or more embodiments of the disclosure, a node in a computer network represented by a directed acyclic graph (DAG) may receive advertisements of smoothed path costs from nodes in its vicinity and, in particular, its preferred parent in the DAG, where the advertisements contain a field for a virtual gain factor (VGF) indicative of a difference between the smoothed path cost and an actual best path cost to the root. The node may then determine a local smoothed path cost from itself to the root, by adding the received path cost to the local link cost, and also a local VGF for each link of the node (for the path as a whole including the particular link) based on all of the received advertisements and VGFs, as well as corresponding actual link costs (e.g., based on selecting alternative parents or actual link costs being smoothed within a dual threshold). The node may then compute a resulting smoothed path cost to the root along with an associated (cumulative) VGF based on the locally determined cost and VGF.

Accordingly, the node may then advertise the resulting smoothed path cost along with the associated (cumulative) VGF on each link, such that, for example, any node receiving a resulting smoothed path cost and/or VGF that surpasses a threshold may request a rebuild of the DAG (e.g., a portion or in its entirety).

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, opticallightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network, which is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication (e.g., and labeled as shown, "LBR," "11," "12," ... "46"). For instance, the links of the computer network may be wired links or may comprise a wireless communication medium, where certain nodes 200 of the network may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
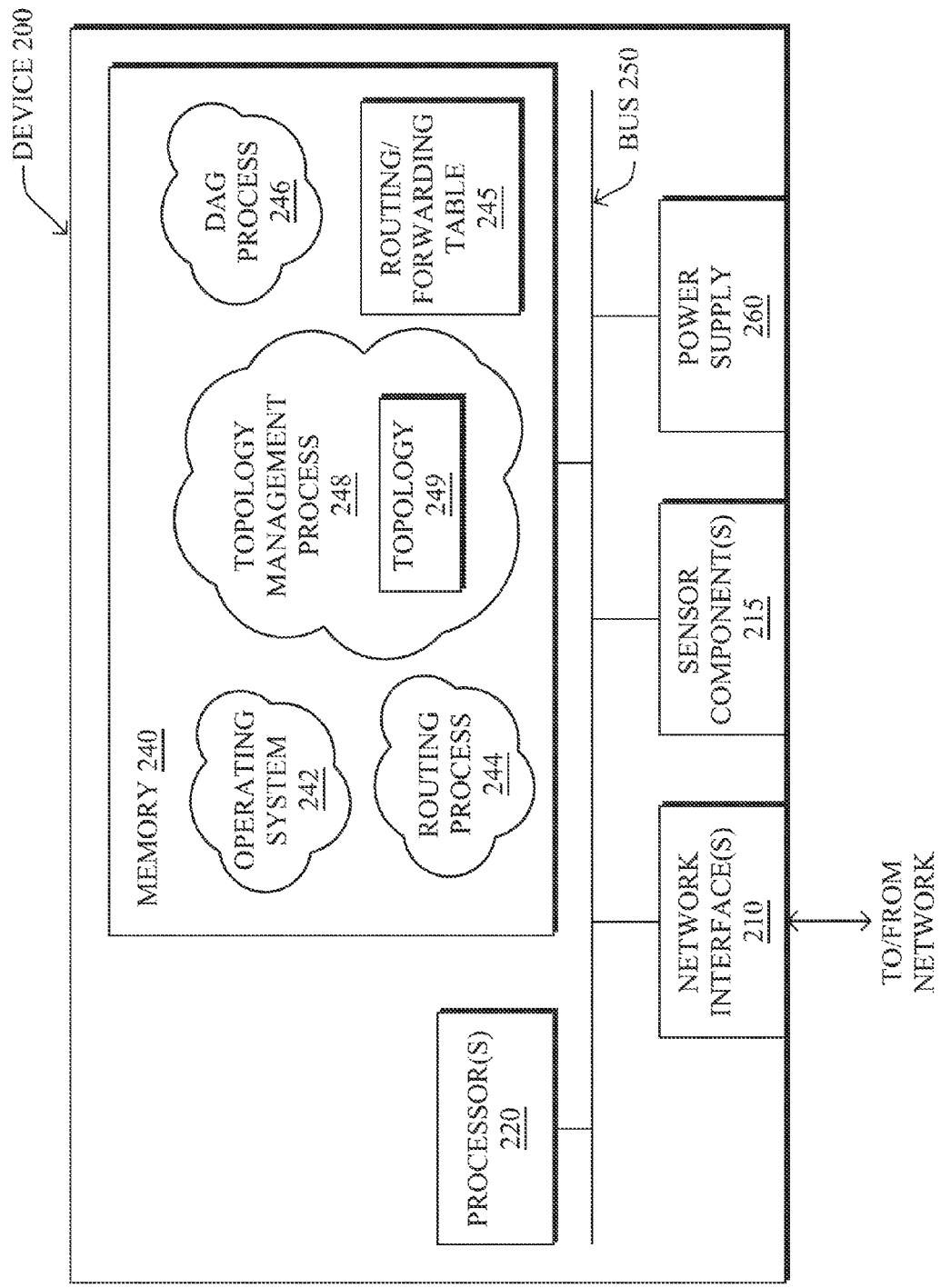
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators, etc.), a power supply 260 (e.g., battery, plug-in, etc.), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor(s) 220 and the network interface(s) 210 for storing software programs and data structures associated with the embodiments described herein. As noted above, certain devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that the various processes may be embodied as modules configured to operate in accordance with the techniques herein (e.g., according to the functionality of a similar process).

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-15> by Winter, at al. (Nov. 6, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or, as used herein, one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks" <draft-ietf-roll-routing-metrics-12> by Vasseur, et al. (Nov. 10, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root which can, in turn, build the topology and locally compute downward routes to all nodes in the DODAG. Such nodes are then reachable using source routing techniques over regions of the DAG that are incapable of storing downward routing state.

Figure 3:
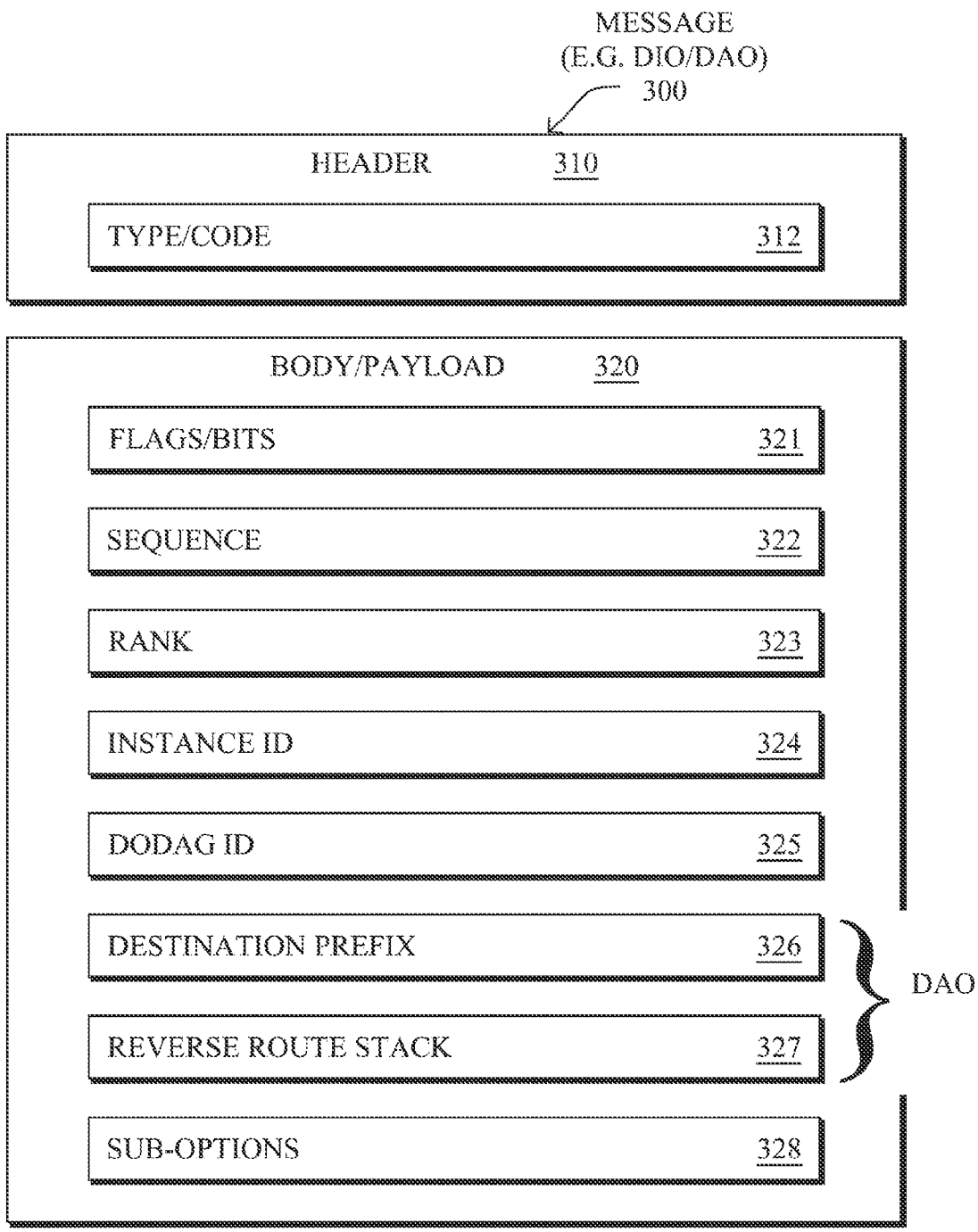
FIG. 3 illustrates an example message.

FIG. 3 illustrates an example message 300 with a simplified control message format that may be used for discovery and route dissemination when building a DAG, e.g., as a DIO or DAO. Message 300 illustratively comprises a header 310 having one or more fields 312 that identify the type of message, (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a (DO)DAG ID 325, and other fields, each as may be appreciated in more detail by those skilled in the art. Further, for DAO messages, fields for a destination prefix 326 and a reverse route stack 327 may also be included. For either DIOs or DAOs, one or more additional sub-option fields 328 may be used to supply additional or custom information (such as, e.g., the VGF) within the message 300. For instance, an objective code point (OCP) sub-option field may be used within a DIO to carry codes specifying a particular objective function (OF) to be used for building the associated DAG.

Cumulative Error Management

As stated above, one problem that confronts LLNs is network stability. By contrast with other IGPs (in particular, link states) where fast convergence technologies have been developed, fast reaction/convergence to link failure would be catastrophic for an LLN, potentially leading to short life cycle in battery operated environments, as well as potentially high levels of congestion due to routing packet control traffic. This also applies to routing metric changes, since in many networks these metrics are dynamic, where metric values are "smoothed out" and new metrics are only advertised when their values exceed some thresholds ("dual-thresholds," i.e., upper and lower thresholds surrounding a current metric).

In other words, to reduce management traffic, techniques limit response to link failure and smooth dynamic metric values so new metrics are only advertised when their values exceed some threshold. In particular, since electing a new parent in a DAG may lead to unstable routing topologies, traffic flaps, jitter, etc., new metrics are advertised only if the metric values substantially change. The disadvantage of such an approach is the resulting cumulative effect (cumulative error), where for "deep" networks (networks having a large number of hops, e.g., 20 hops), the cumulative error could result in either a better unselected path being available or, conversely, a selected path that is worse than believed. For instance, a potential metric value change, e.g., a path cost gain of 5% at each hop, would lead to a fairly sub-optimal path for a node deep in the network (if the actual path cost is significantly lower than the advertised path cost, the node could have attracted more nodes, thus offering a more optimal path). Conversely, if the advertised path cost (via the same parent or a different parent) at each hop is actually 5% higher, it may be worthwhile for a node to change its parent. Current solutions in RPL consist of rebuilding the entire DAG manually or upon the expiration of a timer, which can be costly, inefficient, and not related to actual changes in the network.

According to one or more embodiments herein, therefore, a method and apparatus is described to reduce the cumulative effect of such dynamic metric advertisements, e.g., those governed by dual-thresholds, in a distributed fashion. Specifically, according to one or more embodiments of the disclosure, a node in a computer network represented by a DAG may receive advertisements of smoothed path costs to a root node of the DAG, where the advertisements contain a field for a virtual gain factor (VGF) indicative of a difference between the smoothed path cost and an actual path cost to the root. The node may then determine a local smoothed path cost from itself to the root, and also a local VGF for each link of the node (for the path as a whole including the particular link) based on all of the received advertisements and VGFs, as well as corresponding actual link costs (e.g., based on selecting alternative parents or actual link costs being smoothed within a dual threshold). The node may then compute a resulting smoothed path cost to the root along with an associated (cumulative) VGF based on the locally determined cost and VGF. Accordingly, the node may then advertise the resulting smoothed path cost along with an associated (cumulative) VGF on each link, such that, for example, any node receiving a resulting smoothed path cost and/or VGF that surpasses a threshold may request a rebuild of the DAG (e.g., a portion or in its entirety).

Illustratively, the techniques described herein may be performed by hardware, software, and/or firmware, such as in accordance with DAG process 246, which may contain computer executable instructions executed by the processor(s) 220 to perform functions relating to the novel techniques described herein, e.g., in conjunction with routing process 244.

Operationally, as a distance vector routing protocol, RPL advertises (e.g., using a link local IPv6 Multicast address) a number of parameters including a set of path costs (if using more than one metric and constraint). Each node in the vicinity of the advertising router may then elect a best parent by adding a locally estimated link cost, which may or may not be symmetrical (i.e., the link cost may not be the same for both directions over the link). The use of a threshold based cost update may be used to stabilize such a network by, e.g., minimizing the routing traffic and energy used by the routing protocol with too frequent topology changes. But even a 5% threshold effect on the link cost (path cost is not updated unless there is at least a 5% variation of the uplink cost) ineluctably leads to a potential sub-gain detrimental to a number of applications in Smart Grid networks.

The first component of these embodiments involves propagating (advertising) the actual (smoothed) best path cost, as conventionally performed by RPL, along with an additional virtual gain factor (VGF) associated with the advertised path cost. Upon receiving the advertised path cost to the root and VGF from, e.g., a node "i," a receiving node M determines the current best path cost and adds its own local VGF to the received VGF(i). In other words, the receiving node M determines the local link cost for the link to node i, as well as the VGF associated with that cost, computes a resulting smoothed path cost to the root along with a resulting (cumulative) VGF (i+M) based on the locally determined cost and VGF by, e.g., adding the locally determined cost and locally determined VGF to the received path cost and received VGF, and then advertises the resulting smoothed path cost to the root along with resulting VGF (i+M). This advertisement reflects the best possible path cost assuming an upper node in the DAG changes its routing decision and elects a parent that would provide the advertised best path cost (including the potential gain). If the path cost gain exceeds a pre-defined threshold, it may then be worth rebuilding the DAG shape or a portion of the DAG (since with this described technique is not necessary to build the entire DAG).

Figure 4A:
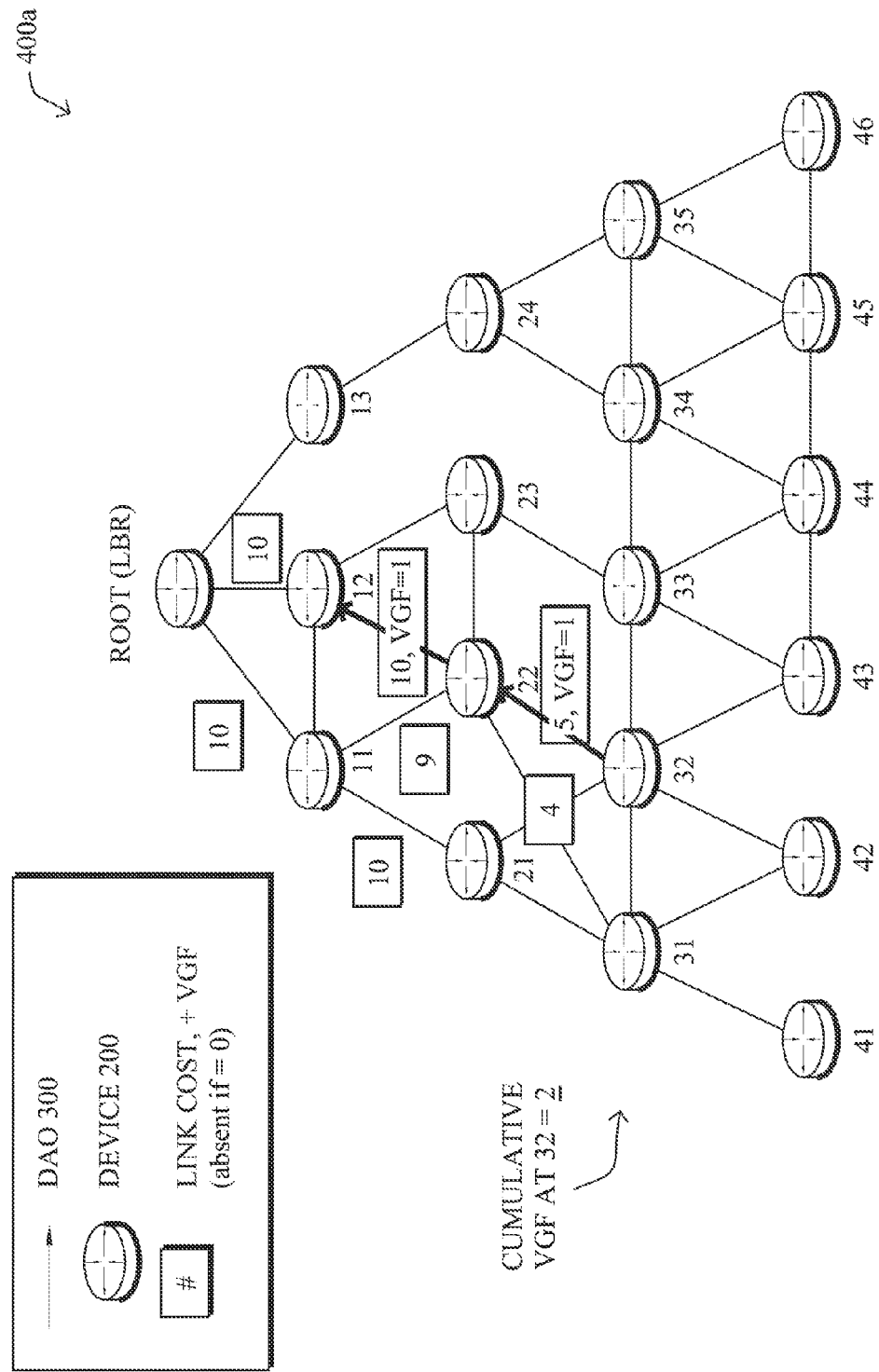
FIGS. 4A-B illustrate an example DAG with virtual gain factor (VGF) utilization.

For example, in the DAG shown in FIG. 4A, suppose that the node 22 advertises a smoothed path cost of 20 to the root, i.e., along the path of node 22 to node 12 (link cost of 10) and node 12 to root (link cost of 10). However, node 22 also advertises a VGF(22)=1 because it selects node 11 as best parent upon, e.g., discovering that the cost of the link 22-11 has decreased (to 9) or, perhaps, discovering a lower link cost (of 9) to node 11 after selecting node 12 as its parent. Node 22 thus advertises a VGF(22)=1 should it elect a new parent (11). Suppose also that the current link cost for the link 32-22 is 5 with VGF=1. At this point, the node 32 advertises a smoothed path cost of 25 with VGF(32)=2, the cumulated effect.

Figure 4B:
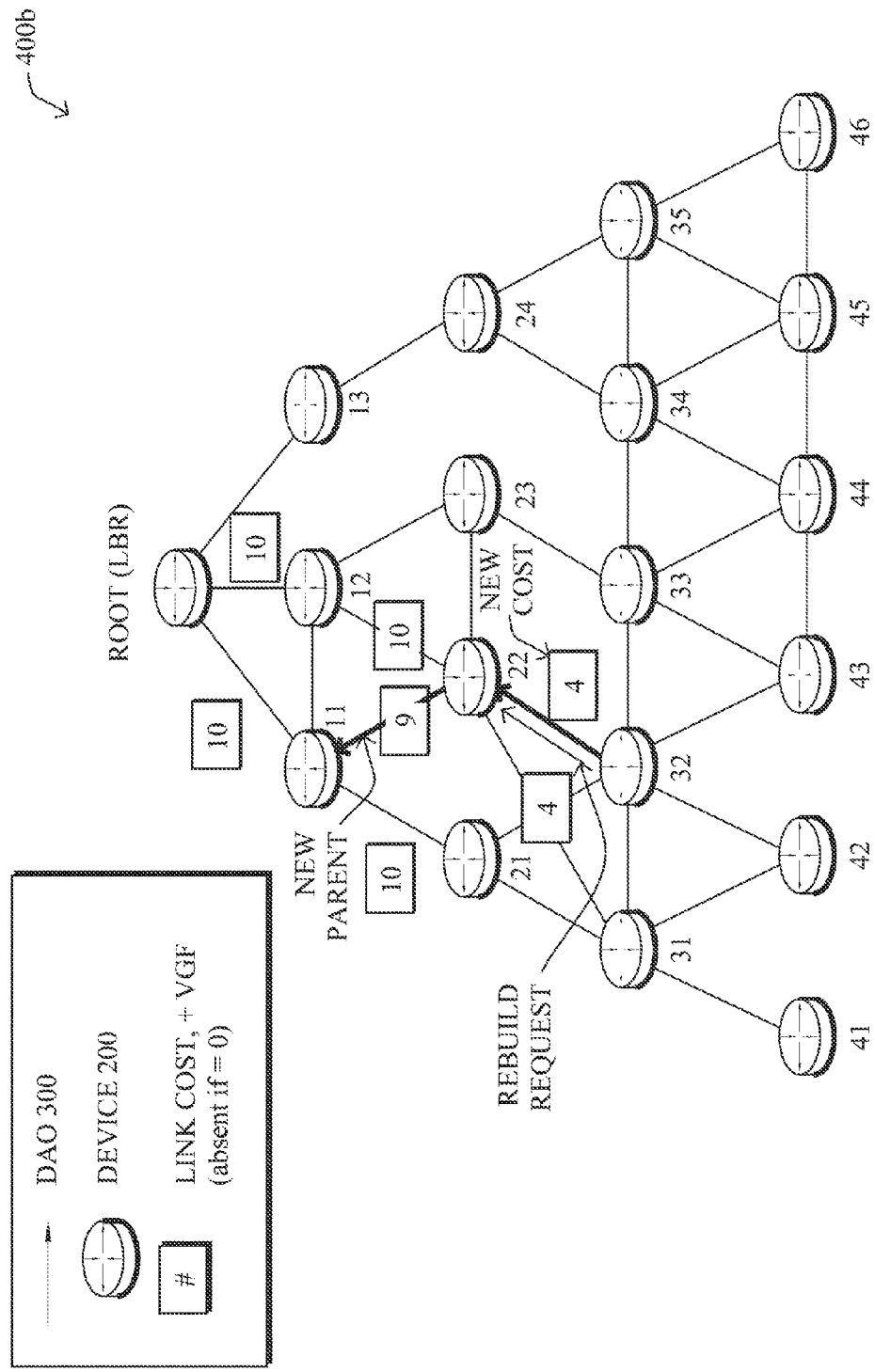

As the path cost propagates deeper in the DAG, it may very well be that the cumulative VGF(K) is greater than some constant (threshold), thus justifying a DODAG rebuild. For example, node 32 could send a request to node 22, requesting a DAG rebuild. In response, node 22 would select node 11 as a new best parent, and the new cost of link 32-22 is accurately reflected (FIG. 4B). In this example, the VGF could be obtained by changing a parent (at node 22) or because of a link cost decrease (32-22). Note that the scenario may be more complex, with an advertised path cost having an even higher VGF (for example by electing 21 as the best parent for 32).

According to these embodiments, therefore, a second component involves rebuilding a DAG (or at least portions thereof, i.e., global versus local repair). Upon receiving a smoothed path cost and/or that crosses (surpasses) pre-defined thresholds (e.g., on a per topology basis since RPL supports Multi-topology routing), a node can request a DAG re-shape that will recursively travel in the UP direction to trigger its ancestor(s) to effectively change their parent selection for the benefit of their children. Propagation of such changes in the UP direction in the DAG may be limited by adding the node's rank in the VGF. Note that this does not generally add substantial traffic control since control traffic for prefix advertisement travels in the UP direction. Upon receiving such a request, nodes can effectively decide whether or not to satisfy the request according to the number of requesters and other factors. Conventional routing oscillation avoidance mechanisms may still be used at all levels of the DAG.

Note that multiple nodes along the path may have to change their parent selection, thus resulting in changes at multiple levels/ranks. Note also that the request may stop at an ancestor that is not the DAG root, thus limiting the impact of rebuilding the DAG shape for the best cost benefit.

Moreover, it should be noted that the same technique can be used as link cost increases (resulting, e.g., in VGF(i)<0). In this case, a node may simply elect a new parent to thereby allow (partial) rebuild of the DAG when the cost becomes unacceptably sub-optimal for some nodes. In other words, a VGF value may be a negative value (e.g., reflecting an increase cost or gain) or a positive value (e.g., reflecting a decrease cost or loss and, at each hop, the cumulative effect of each hop is accounted for, accordingly.

Figure 5:
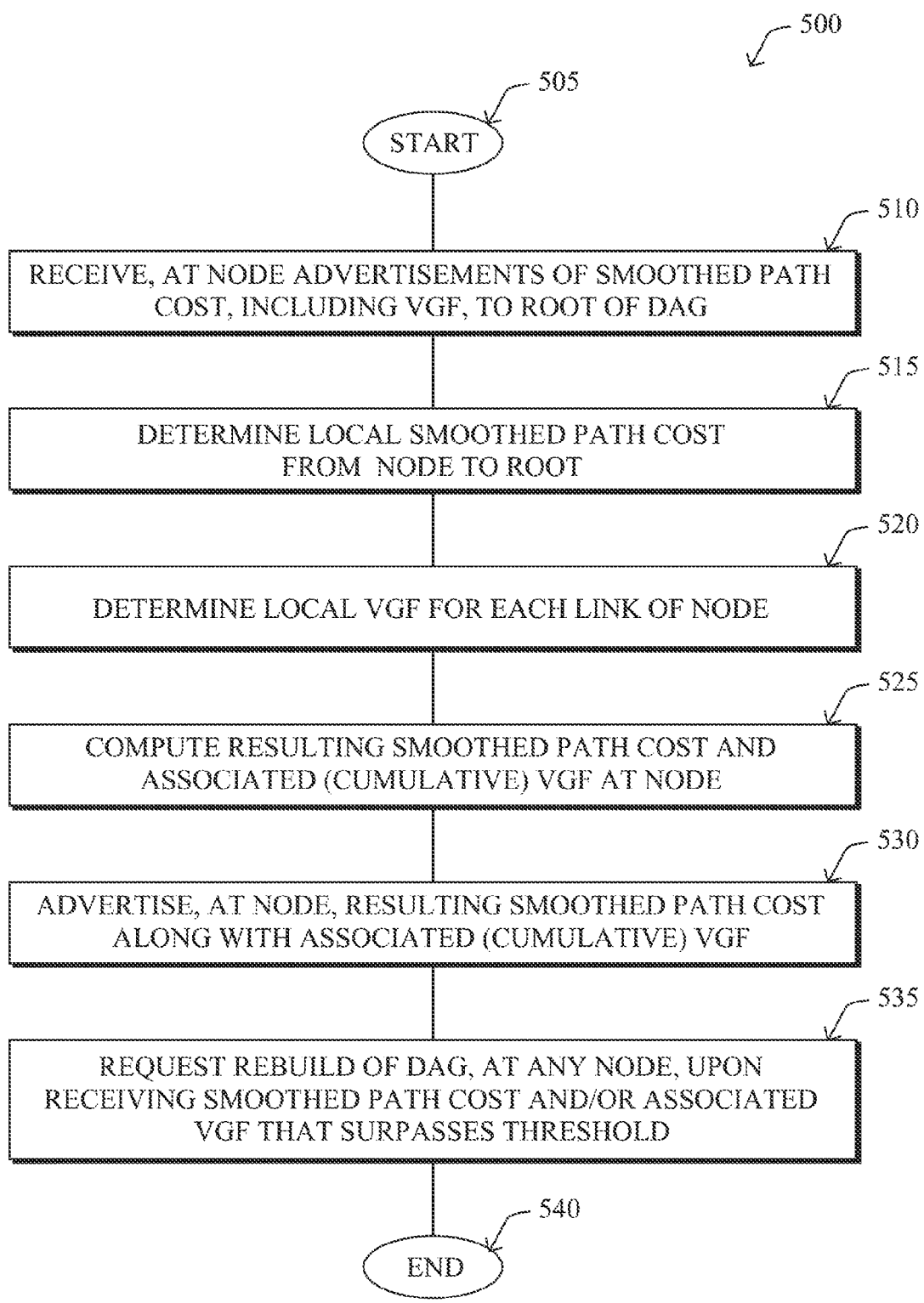
FIG. 5 illustrates an example simplified procedure for managing cumulative error in a DAG that smoothes metrics.

FIG. 5 illustrates an example simplified procedure for managing cumulative error in a DAG that smoothes metrics in accordance with one or more embodiments described herein. The procedure 500 starts at step 505, and continues to step 510, where a node 200 may receive one or more advertisements of smoothed path costs to a root node of a computer network represented by the DAG, where each advertisement contains a field for a VGF indicative of a difference between the smoothed path cost and an actual best path cost to the root. In step 515, the node may determine a local smoothed path cost from itself to the root node, and in step 520, may also determine a local VGF for each link of the node (for the path as a whole including the particular link) based on all of the received advertisements and VGFs, as well as corresponding actual link costs (e.g., based on selecting alternative parents or actual link costs being smoothed within a dual threshold). In Step 525, the node computes a resulting smoothed path cost to the root node along with an associated (cumulative) VGF. Thereafter, in step 530, the node may advertise the resulting smoothed path cost along with the associated (cumulative) VGF on each link to other nodes of the network such that, in step 535, any node receiving a resulting smoothed path cost and/or associated VGF that surpasses a threshold may request a rebuild of the DAG (e.g., a portion or in its entirety). The procedure 500 ends in step 540.

The novel techniques described herein manage smoothed metric value error accumulation for DAGs in a computer network. In particular, as described above, by reporting the cumulative gain/loss (e.g., the VGF), along with providing a mechanism that allows for signaling that cumulative effect to trigger a routing topology change, the novel techniques alleviate the fairly common situation where paths within a DAG become very sub-optimal and even unacceptable for nodes deep in the network. In addition, the techniques above utilize only lightweight additional traffic control for a potential significant gain in terms of path quality.

While there have been shown and described illustrative embodiments that manage DAGs in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not so limited, and may, in fact, be used with other types of networks and/or protocols utilizing DAG routing (e.g., distance vector protocols).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware,

What is claimed is:

1. A method comprising:

identifying, via a processor, a gain factor at a first node in a network represented by a directed acyclic graph (DAG), wherein the gain factor indicates a potential gain that can be obtained in link cost from the first node to a root node of the DAG when an upper node in the DAG changes its routing decision by selecting a different parent node;

when the gain factor exceeds a pre-defined threshold, transmitting a DAG rebuild request from the first node to other nodes in the DAG, wherein the DAG rebuild request recursively travels in an upward direction in the DAG;

determining whether to satisfy the DAG rebuild request based on a number of requesting nodes upon receiving the DAG rebuild request at a second node in the network; and based on the determining step, at least partially rebuilding the DAG by selecting a new parent node for the second node, wherein the selection of the new parent node causes a decrease in link cost from the first node to the root node.

2. The method of claim 1, wherein identifying the gain factor comprises identifying an actual path cost to the root node.

3. The method of claim 1, wherein the DAG rebuild request recursively travels in the upward direction in the DAG to trigger one or more ancestor nodes of the first node to change their parent node selection.

4. The method of claim 1, wherein transmitting a DAG rebuild request comprises using a routing oscillation avoidance mechanism.

5. The method of claim 1, wherein the pre-defined threshold is defined on a per-topology basis.

6. The method of claim 1, wherein the DAG rebuild request stops at an ancestor node before reaching the root node.

7. The method of claim 1, wherein the gain factor is a cumulative gain factor.

8. A system comprising:

a processor; and a computer-readable storage medium storing instructions which, when executed by the processor, cause the processor to perform operations comprising:

identifying a gain factor at a first node in a network represented by a directed acyclic graph (DAG), wherein the gain factor indicates a potential gain that can be obtained in link cost from the first node to a root node of the DAG when an upper node in the DAG changes its routing decision by selecting a different parent node;

when the gain factor exceeds a pre-defined threshold, transmitting a DAG rebuild request from the first node to other nodes in the DAG, wherein the DAG rebuild request recursively travels in an upward direction in the DAG;

determining whether to satisfy the DAG rebuild request based on a number of requesting nodes upon receiving the DAG rebuild request at a second node in the network; and based on the determining step, at least partially rebuilding the DAG by selecting a new parent node for the second node, wherein the selection of the new parent node causes a decrease in link cost from the first node to the root node.

9. The system of claim 8, wherein identifying the gain factor comprises identifying an actual path cost to the root node.

10. The system of claim 8, wherein the DAG rebuild request recursively travels in the upward direction in the DAG to trigger one or more ancestor nodes of the first node to change their parent node selection.

11. The system of claim 8, wherein transmitting a DAG rebuild request comprises using a routing oscillation avoidance mechanism.

12. The system of claim 8, wherein the pre-defined threshold is defined on a per-topology basis.

13. The system of claim 8, wherein the DAG rebuild request stops at an ancestor node before reaching the root node.

14. The system of claim 8, wherein the gain factor is a cumulative gain factor.

15. A computer-readable storage device storing instructions which, when executed by a processor, cause the processor to perform operations comprising:

identifying a gain factor at a first node in a network represented by a directed acyclic graph (DAG), wherein the gain factor indicates a potential gain that can be obtained in link cost from the first node to a root node of the DAG when an upper node in the DAG changes its routing decision by selecting a different parent node;

when the gain factor exceeds a pre-defined threshold, transmitting a DAG rebuild request from the first node to other nodes in the DAG, wherein the DAG rebuild request recursively travels in an upward direction in the DAG;

determining whether to satisfy the DAG rebuild request based on a number of requesting nodes upon receiving the DAG rebuild request at a second node in the network; and based on the determining step, at least partially rebuilding the DAG by selecting a new parent node for the second node, wherein the selection of the new parent node causes a decrease in link cost from the first node to the root node.

16. The computer-readable storage device of claim 15, wherein identifying the gain factor comprises identifying an actual path cost to the root node.

17. The computer-readable storage device of claim 15, wherein the DAG rebuild request recursively travels in the upward direction in the DAG to trigger one or more ancestor nodes of the first node to change their parent node selection.

18. The computer-readable storage device of claim 15, wherein transmitting a DAG rebuild request comprises using a routing oscillation avoidance mechanism.

19. The computer-readable storage device of claim 15, wherein the pre-defined threshold is defined on a per-topology basis.

20. The computer-readable storage device of claim 15, wherein the DAG rebuild request stops at an ancestor node before reaching the root node.

* * * * *